United States Patent

Mizutani et al.

[11] Patent Number: 5,945,481
[45] Date of Patent: Aug. 31, 1999

[54] CASES FOR MEMORY DISKS HAVING EXCELLENT ANTISTATIC PROPERTIES

[75] Inventors: Toshikazu Mizutani; Jichio Deguchi, both of Yokkaichi, Japan

[73] Assignee: Mitsubishi Chemical Corporation, Tokyo, Japan

[21] Appl. No.: 08/891,708

[22] Filed: Jul. 9, 1997

[30] Foreign Application Priority Data

Jul. 9, 1996 [JP] Japan .................................. 8-179662
Jul. 1, 1997 [JP] Japan .................................. 9-190424

[51] Int. Cl.$^6$ .............................. B65D 1/00; C08L 23/10; C08L 33/26
[52] U.S. Cl. .................................. 525/71; 525/79; 525/93; 525/95; 525/193; 525/232; 525/236; 525/237; 252/500
[58] Field of Search .................................. 525/71, 79, 93, 525/95, 193, 232, 236, 237; 252/500

[56] References Cited

U.S. PATENT DOCUMENTS 5,480,932  1/1996  Kobayashi et al. ........................ 523/71

Primary Examiner—Nathan M. Nutter
Attorney, Agent, or Firm—Oblon, Spivak, McClelland, Maier & Neustadt, P.C.

[57] ABSTRACT

A case for memory disks having excellent antistatic properties, which comprises a thermoplastic resin composition comprising 100 parts by weight of the following component (A), 3 to 30 parts by weight of the following component (B) and 5 to 40 parts by weight of the following component (C):

component (A): a crystalline propylene resin having a melt flow rate (MFR) of 1 to 80 g/10 min;

component (B): a thermoplastic elastomer selected from ($b^1$) olefin copolymer elastomers having a Mooney viscosity ($ML_{1+4}$ (100° C.)) of 10 to 85, and ($b^2$) hydrogenated products of a block copolymer of styrene or a derivative thereof and a conjugated diene, containing 15 to 50% by weight of styrene or a derivative thereof, having a weight-average molecular weight of 50,000 to 220,000; and component (C): an acrylamide copolymer.

9 Claims, 3 Drawing Sheets

CASES FOR MEMORY DISKS HAVING EXCELLENT ANTISTATIC PROPERTIES

BACKGROUND OF THE INVENTION

1. Field of the Invention

The present invention relates to cases to be used for the storage or transportation of memory disks such as compact disks and magnetic disks, especially hard disks, and particularly to cases for memory disks having excellent antistatic properties, capable of preventing the generation of static electricity which may be caused during the storage or transportation of memory disks.

2. Background Art

Heretofore, crystalline propylene thermoplastic resins have been used to make cases or containers to be employed for storage or transportation in various fields. This is because such resins are economical, excellent in molding properties and durability, and also light in weight.

However, crystalline propylene thermoplastic resins have high electrical resistance, and are not conductive, so that cases made from these resins easily generate static electricity and undergo static electrification due to friction, impact, vibration or the like caused during transportation. Various troubles are thus caused.

In particular, in the field of cases for electronic equipments, there have been problems that ICs, LSIs and the like placed in the cases are broken or damaged by static electricity generated due to friction, impact, vibration or the like while the cases are being transported. For this reason, it has been a serious subject to impart antistatic properties to such cases.

In particular, with respect to cases to be used for the transportation of memory disks, there have been made studies on techniques relating to the structure and shape of a case which can hold or bind memory disks by connecting their edges to the case so as to prevent the movement of the memory disks, thereby protecting the memory disks from damages due to static electricity, or of a case which can be subjected to a processing step with memory disks stored therein (e.g., Japanese Patent Publication No. 55395/1989).

On the other hand, in order to solve the static electricity problem from the material viewpoint, a conductive filler such as carbon black, or an antistatic agent has been conventionally incorporated into a propylene resin so as to impart thereto conductivity, thereby obtaining a composite resin having antistatic properties.

Metallic fiber, metallized fiber, carbon black, carbon fiber, graphite, tin oxide, zinc oxide, indium oxide or the like has been used as the conductive filler.

Although such a composite plastic incorporated with a conductive filler can stably and permanently reveal antistatic properties, cases to be used for storage or transportation, made from the composite plastic are heavy in weight because the specific gravity of the filler incorporated is high. Further, some problems other than the problem of static electricity may be newly introduced by staining induced by heavy metallic impurities contained in the above-described conductive fillers, or by dusting caused, depending upon the manner of use, due to the separation of the conductive filler from the composite plastic.

A glycerin-fatty acid ester, an alkyl diethanol amide, a sorbitan-fatty acid ester or the like has been generally used as the antistatic agent to be incorporated into a propylene resin. Such an antistatic agent has a low molecular weight, so that the agent migrates to the surface of the resin and bleeds therefrom after the resin incorporated with the agent is molded. The resin can thus exhibit antistatic properties.

However, the antistatic agent bleeding on the surface of the resin is readily removed by washing or the like. It is therefore difficult for the resin to stably and permanently retain the antistatic properties. Further, a case made from the resin has such a shortcoming that the antistatic agent bleeding on the surface of the resin tends to stain the content of the case, for example, memory disks.

Thus, the above-described conventional propylene resins imparted with antistatic properties are still unsatisfactory for use as cases for the storage or transportation of memory disks.

In order to solve the aforementioned problems, techniques for imparting antistatic properties to propylene resins, in which one of the following hydrophilic polymers is incorporated into a propylene resin, have been proposed recently:

(1) a mixture of a specific polyether ester amide and a modified vinyl copolymer having a carboxyl group, disclosed in Japanese Laid-Open Patent Publication No. 23435/1985;

(2) a comb copolymer of a polymeric monomer obtained by converting carboxyl group at the terminal end of polymethyl methacrylate into methacryloyl group by using glycidyl methacrylate, and an aminoalkyl acrylate or acrylamide, or a quaternized cation-modified product thereof, disclosed in Japanese Laid-Open Patent Publication No. 121717/1987; and (3) an acrylamide copolymer consisting of ethylene structural unit, acrylate structural unit and acrylamide structural unit, or a polyolefin resin composition comprising the acrylamide copolymer, disclosed in U.S. Pat. No. 5,202,193 and Japanese Laid-Open Patent Publication 126446/1995.

Such a propylene resin composition incorporated with any one of the above hydrophilic polymers is light in weight, and can stably and permanently reveal antistatic properties; however, the hydrophilic polymer particles dispersed in the resin composition tend to form streaks in the direction of molding when the resin composition is melt molded because the compatibility between the hydrophilic polymer and the propylene resin is poor. As a result, delamination is caused due to the streakily dispersed hydrophilic polymer particles, existing in the vicinity of the surface of the molded product. The delamination frequently causes such troubles that the appearance of the molded product becomes worse and that the impact resistance of the molded product is impaired. A satisfactory propylene resin case having antistatic properties is thus not available so far.

An object of the present invention is to provide a case for memory disks which can stably and permanently reveal antistatic properties, which is free from the shortcomings in the prior art, such as the separation or uneven dispersion of an antistatic-properties-imparting component, and which has high mechanical strength and lightweight properties.

SUMMARY OF THE INVENTION

It has now been found that the above-described object can be attained by using as a material a specific composition in which a specific thermoplastic elastomer and an acrylamide copolymer are blended with a propylene resin in specific proportions.

Thus, the case for memory disks of the present invention having excellent antistatic properties comprises a thermoplastic resin composition comprising 100 parts by weight of the following component (A), 3 to 30 parts by weight of the following component (B) and 5 to 40 parts by weight of the following component (C):

component (A): a crystalline propylene resin having a melt flow rate (MFR) of 1 to 80 g/10 min;

component (B): a thermoplastic elastomer selected from ($b^1$) olefin copolymer elastomers having a Mooney viscosity (ML1+4 (100° C.)) of 10 to 85, and ($b^2$) hydrogenated products of a block copolymer of styrene or a derivative thereof and a conjugated diene, containing 15 to 50% by weight of styrene or a derivative thereof, having a weight-average molecular weight of 50,000 to 220,000; and component (C): an acrylamide copolymer.

DETAILED DESCRIPTION OF THE INVENTION

Figure 1:
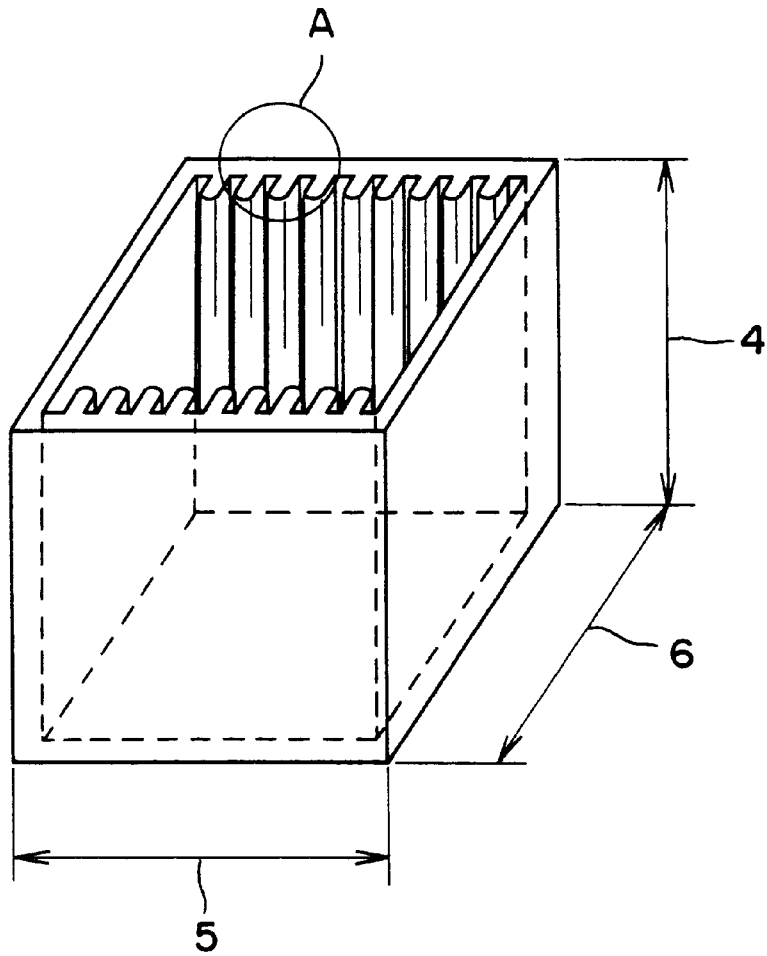
FIG. 1 is a perspective view showing the case for memory disks obtained in Example 1.

[1] Thermoplastic Resin Composition
(1) Components
(a) Crystalline Propylene Resin (Component (A))

In the thermoplastic resin composition to be used as a material for the case of the present invention, a propylene resin having a melt flow rate (MFR, at 230° C., under a load of 2.16 kg) of 1 to 80/10 min, preferably 3 to 60 g/10 min, more preferably 3 to 40 g/10 min, as measured in accordance with ASTM D1238, is used as the crystalline propylene resin component. Examples of such a propylene resin include propylene homopolymers, propylene-ethylene block copolymers, and propylene-ethylene-butene random copolymers, in which the ethylene content is from 0 to 15% by weight, preferably from 2 to 12% by weight, more preferably from 4 to 10% by weight, and the alpha-olefin (C=4 to 12) content is from 0 to 20% by weight, preferably from 0 to 10% by weight, more preferably from 0 to 5% by weight.

The crystallinity of the propylene resin measured by X-ray diffractometry is generally from 50 to 90%, preferably from 60 to 85%, more preferably from 65 to 80%.

When a crystalline propylene resin having an MFR of lower than the above-described range is used, the resulting resin composition has an elevated heating melt viscosity. Such a resin composition is poor in molding properties, and the molded product therefore tends to have poor appearance. On the other hand, when a crystalline propylene resin having an MFR of higher than the above range is used, the resulting resin composition has decreased mechanical strength. Therefore, such a resin composition cannot be used for producing cases.

When the crystallinity of the propylene resin is lower than 50%, the resulting resin composition has a low rigidity. When the crystallinity exceeds 90%, on the other hand, the resulting resin composition tends to have a low impact strength.

(b) Thermoplastic Elastomer (Component (B))

In the thermoplastic resin composition to be used as a material for the case of the present invention, a thermoplastic elastomer selected from ($b^1$) olefin copolymer elastomers having a Mooney viscosity (ML1+4 (100° C.)), as measured in accordance with ASTM D1646, of 10 to 85, and ($b^2$) hydrogenated products of a block copolymer of styrene or a derivative thereof and a conjugated diene (hereinafter may be simply referred to as a styrene elastomer), containing 15 to 50% by weight of styrene or a derivative thereof is used as the thermoplastic elastomer component, the component (B). The compatibility of thermoplastic elastomers other than the above ones with the above component (A) is poor, so that such thermoplastic elastomers will be a cause of delamination.

Further, the olefin elastomers are more preferable than the styrene elastomers because they are highly compatible with both the components (A) and (C).

(1) Olefin copolymer elastomer ($b^1$)

A copolymer of ethylene and other monomer, having rubber elasticity and a Mooney viscosity (ML1+4 (100° C.)), as measured according to ASTM D1646, of 10 to 85, preferably 15 to 80, more preferably 20 to 75 is used as the olefin copolymer elastomer ($b^1$).

Specific examples of such an olefin copolymer elastomer include ethylene-propylene copolymer elastomers (EPMs), ethylene-butene-1 copolymer elastomers (EBMs), and ethylene-propylene-unconjugated diene copolymer elastomers (EPDMS) with an unconjugated diene such as 5-ethylidene-2-norbornene, 5-methylene-2-norbornene or dicyclopentadiene.

An olefin copolymer elastomer having a weight-average molecular weight of 50,000 to 250,000, preferably 100,000 to 250,000 is suitably used in the present invention.

When an olefin copolymer elastomer whose Mooney viscosity is lower than the above-described range is used, such an elastomer cannot act as a component for fixing the uniform network dispersion of the acrylamide copolymer, the component (C), which is an aim of the present invention. In addition, the elastomer cannot fully reinforce the impact resistance of the resulting resin composition, so that it is of no practical use. On the other hand, an olefin copolymer elastomer whose Mooney viscosity is in excess of the above range is lacking in dispersibility in the propylene polymer. Therefore, when such an elastomer is used, the molded product obtained from the resulting resin composition is to have poor appearance. Thus, this elastomer is of no practical use.

An olefin copolymer elastomer whose weight-average molecular weight is less than the above-described range tends to have impaired rubber elasticity and decreased mechanical strength. On the other hand, when an olefin copolymer elastomer whose weight-average molecular weight is more than the above range is used, the resulting resin composition tends to have impaired molding properties, so that the molded product obtained from the composition cannot have good appearance.

In the case where an ethylene-propylene copolymer elastomer (EPM) is used as the olefin copolymer elastomer, it is favorable to use one whose propylene content is from 10 to 60% by weight (ethylene content being 90 to 40% by weight), preferably from 15 to 55% by weight (ethylene content being 85 to 45% by weight). The propylene contents (ethylene contents) herein defined are those which are determined by infrared spectroscopic analysis or the like.

There is no particular limitation on the method of production of the olefin copolymer elastomers and on the shape of the product (pellet, bale, crumb, etc.). It is also possible to use those olefin copolymer elastomers which have been crosslinked chiefly by radicals by heat-treating the above-described olefin copolymer elastomers in the presence of an organic peroxide.

(2) Hydrogenated product of a block copolymer of styrene or a derivative thereof and a conjugated diene ($b^2$)

The hydrogenated product of a block copolymer of styrene or a derivative thereof and a conjugated diene to be used in the present invention is one obtained by hydrogenating a block copolymer of styrene or a derivative thereof and a conjugated diene, having a styrene content of 5 to 50% by weight.

Examples of the derivative of styrene include alpha-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, and 4-(phenylbutyl)-styrene. Of these, styrene and alpha-methylstyrene are preferred. Typical conjugated dienes are butadiene, alkyl-substituted butadienes such as isoprene and 2,3-dimethylbutadiene, methylpentadiene, and a mixture thereof. Of these, butadiene, isoprene, or a mixture thereof is preferably used in the present invention as the conjugated diene.

In the case where a mixture of isoprene and butadiene is used as the conjugated diene, one with an isoprene/butadiene ratio (weight basis) of 99/1 to 1/99, preferably 90/10 to 30/70, more preferably 80/20 to 40/60 is suitable.

Specifically, styrene-ethylene-butylene-styrene copolymer (SEBS) which is a hydrogenated product of a styrene-butadiene block copolymer, or styrene-ethylene-propylene-styrene copolymer (SEPS) which is a hydrogenated product of a styrene-isoprene block copolymer can be mentioned as the component ($b^2$).

Of these, SEPS is preferred from the viewpoint of the compatibility with the component (A).

A hydrogenated product of a block copolymer of styrene or a derivative thereof and a conjugated diene, having a weight-average molecular weight of 50,000 to 220,000, preferably 50,000 to 200,000, more preferably 50,000 to 150,000 is suitably used as the component ($b^2$).

The "weight-average molecular weight" herein defined is one determined by gel permeation chromatography under the following conditions, calculated in terms of polystyrene:

apparatus: 150C ALC/GPC (manufactured by MILLIPORE Corp.), column: 3 pieces of AD80M/S (manufactured by Showa Denko K.K.), solvent: o-dichlorobenzene, temperature: 140° C., flow velocity: 1 ml/min, amount injected: 200 microliters, and concentration: 2 mg/ml (0.2% by weight of an antioxidant, 2,6-di-t-butyl-p-phenol was added. The concentration was detected at a wavelength of 3.42 micrometers by an infrared spectrophotometer "MIRAN 1A" manufactured by FOXBORO Corp.).

When a component ($b^2$) whose weight-average molecular weight is less than the above-described range is used, the component (B) is dispersed by being oriented to the direction of flow. Therefore, it is impossible to obtain a resin composition in which the uniform network dispersion of the acrylamide copolymer, the component (C), an aim of the present invention, is attained. In addition, such a resin composition tends to have impaired rubber elasticity and decreased mechanical strength. On the other hand, a component (b2) whose weight-average molecular weight is in excess of the above-described range tends to impair the molding properties of the resulting resin composition, thus providing a molded product having bad appearance.

The block copolymer of styrene or a derivative thereof and a conjugated diene is one whose styrene or its derivative content is from 15 to 50% by weight, preferably from 18 to 45% by weight, more preferably from 20 to 40% by weight.

A block copolymer whose styrene or its derivative content is lower than the above range is poor in both rubber elasticity and strength, so that such a block copolymer is of no practical use. On the other hand, a block copolymer whose styrene or its derivative content is higher than the above range has poor compatibility with the acrylamide copolymer, the component (C) and with the crystalline propylene resin, the component (A). Therefore, the resulting resin composition cannot have sufficiently high impact resistance required for those materials which are used for producing cases to be used for storage or transportation.

Further, it is preferable that the rate of hydrogenation of the component ($b^2$) be 95% by weight or more, particularly from 97 to 100% by weight from the viewpoint of weather resistance.

When the above-described thermoplastic elastomer is not used, the uniform network dispersion of the acrylamide copolymer cannot be attained in the resulting resin composition, and delamination tends to be readily occurred, as will be described later.

(c) Acrylamide Copolymer (Component (C))

The following copolymer (1) or (2) is used as the acrylamide copolymer for the thermoplastic resin composition of the present invention, having excellent antistatic properties.

These acrylamide copolymers can be prepared in accordance with the known methods described in U.S. Pat. No. 5,202,193 and Japanese Laid-Open Patent Publication 126446/1995.

(1) An acrylamide copolymer having a weight-average molecular weight of 1,000 to 50,000, preferably 3,000 to 35,000, comprising the following structural units which are linearly and irregularly arranged:

65 to 99 mol %, preferably 85 to 97 mol % of ethylene structural unit represented by the following general formula (I):

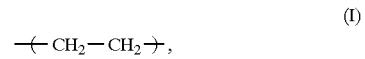

0 to 15 mol %, preferably 3 to 7 mol % of acrylate structural unit represented by the following general formula (II):

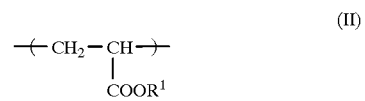

wherein $R^1$ represents an alkyl group having 1 to 4 carbon atoms, preferably 1 or 2 carbon atoms, and 1 to 35 mol %, preferably 3 to 15 mol % of acrylamide structural unit represented by the following general formula (III):

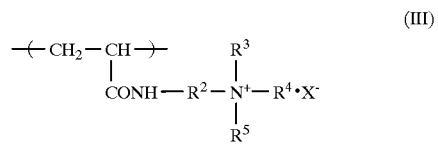

wherein $R^2$ represents an alkylene group having 2 to 8 carbon atoms, preferably 2 or 3 carbon atoms, $R^3$ and $R^4$ each represent an alkyl group having 1 to 4 carbon atoms, preferably 1 or 2 carbon atoms, $R^5$ represents an alkyl group having 1 to 12 carbon atoms, preferably 1 or 2 carbon atoms, an arylalkyl group having 1 to 12 carbon atoms, or an alicyclic alkyl group having 1 to 12 carbon atoms, and $X^-$ represents a halogen ion, preferably $Cl^-$, or $CH_3OSO_3^-$ or $C_2H_5OSO_3^-$; or (2) an acrylamide copolymer having a weight-average molecular weight of 1,000 to 50,000, preferably 3,000 to 35,000, comprising the following structural units which are linearly and irregularly arranged:

65 to 99 mol %, preferably 85 to 97 mol % of ethylene structural unit represented by the following general formula (IV):

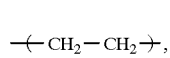
(IV)

0 to 15 mol %, preferably 3 to 7 mol % of acrylate structural unit represented by the following general formula (V):

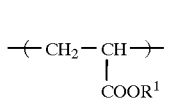
(V)

wherein $R^1$ represents an alkyl group having 1 to 4 carbon atoms, preferably 1 or 2 carbon atoms, and 1 to 35 mol % of acrylamide structural unit represented by the following general formula (VI):

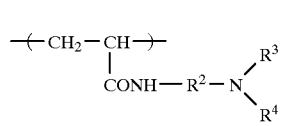
(VI)

wherein $R^2$ represents an alkylene group having 2 to 8 carbon atoms, preferably 2 or 3 carbon atoms, and $R^3$ and $R^4$ each represent an alkyl group having 1 to 4 carbon atoms, preferably 1 or 2 carbon atoms.

In the case where the proportion of the ethylene structural unit is less than 65 mol %, the acrylamide copolymer has a lowered softening point, so that tackiness or stickiness is imparted to the resulting thermoplastic resin composition. On the other hand, when the proportion of the ethylene structural unit is in excess of 99 mol %, the acrylamide copolymer has impaired antistatic properties. The proportion of the acrylate structural unit is preferably 15 mol % or less, more preferably 3 to 7 mol % from the viewpoint of the balance between softening point and impact resistance. When the proportion of the acrylamide structural unit is less than 1 mol %, the acrylamide copolymer is to have impaired antistatic properties. On the other hand, the proportion of the acrylamide structural unit is in excess of 35 mol %, the resulting thermoplastic resin becomes hygroscopic.

Further, an acrylamide copolymer having a weight-average molecular weight of less than 1000 is waxy, so that it has poor handling properties. In addition, such an acrylamide copolymer bleeds out from the resulting resin composition, so that stickiness is unfavorably imparted to the resin composition. On the other hand, an acrylamide copolymer whose weight-average molecular weight is more than 50,000 has poor compatibility with both the propylene resin and the thermoplastic elastomer, so that such a copolymer is not favorable.

It is noted that the weight-average molecular weights of the acrylamide copolymers are those which are determined by gel permeation chromatography (GPC), calculated in terms of polystyrene. Specifically, the weight-average molecular weights can be determined by the ultra-high temperature GPC method (the method described by Kinukawa in "Japanese Journal of Polymer Science and Technology" Vol. 44, No. 2, pp. 139–141).

Of these acrylamide copolymers, the copolymer (1) is commercially available as "REOLEX AS 170" from Dai-Ichi Kogyo Seiyaku Co., Ltd.

(2) Amount of Each Component (a) Amount of crystalline propylene resin (component (A))

The thermoplastic resin composition for use in the present invention is prepared by blending the components (B) and (C), respectively in amounts predetermined on the basis of 100 parts by weight of the component (A), with the component (A).

(b) Amount of thermoplastic elastomer

The thermoplastic elastomer is used in an amount of 3 to 30 parts by weight, preferably 5 to 20 parts by weight, more preferably 8 to 15 parts by weight for 100 parts by weight of the above-described propylene resin, the component (A).

When the amount of the thermoplastic elastomer is less than the above range, a uniform network dispersion of the acrylamide copolymer, the component (C), cannot be sufficiently obtained. Therefore, the resulting resin composition cannot have sufficiently high impact resistance required for cases for memory disks. Further, when a case containing memory disks is transported, delamination or peeling-off of the propylene resin component of the case is likely to occur due to vibration or friction during transportation, whereby the contents of the disk is contaminated with the peeled component. On the other hand, when the amount of the thermoplastic elastomer is more than the above range, while the effect of providing a uniform network dispersion of the acrylamide copolymer in the resulting resin composition is not appreciably improved, the resulting resin composition has a remarkably lowered rigidity.

(c) Amount of acrylamide copolymer

The acrylamide copolymer is used in an amount of 5 to 40 parts by weight, preferably 10 to 35 parts by weight, more preferably 15 to 30 parts by weight for 100 parts by weight of the propylene resin, the component (A).

When the amount of the acrylamide copolymer incorporated is less than the above range, the resulting resin composition cannot have antistatic properties. On the other hand, when the amount of the acrylamide copolymer incorporated is in excess of the above range, the resulting resin composition is to have drastically impaired rigidity. Therefore, such a resin composition cannot have sufficiently high rigidity required for cases to be used for storage or transportation of memory disks.

(3) Other Components (Component (D))

Other components such as an antioxidant, a light stabilizer, a lubricant, a flame retarder, a dispersant, a coloring agent such as a dye or pigment, an inorganic filler and an organic filler may be optionally incorporated, when necessary, into the thermoplastic resin composition of the present invention, having excellent antistatic properties.

In particular, 0.01 to 1 part by weight of a coloring agent can be incorporated into 100 parts by weight of the thermoplastic resin composition of the present invention, comprising the above-described components (A), (B) and (C). By doing so, colored molded products which can meet various applications can be obtained.

In general, when a conductive filler is added to a resin in order to impart thereto electrical conductivity, the resin is colored by the filler, and often loses its transparency. With a case made of such a colored opaque material, it is not possible to visually confirm the contents from the outside of the case. On the contrary, the case for memory disks according to the present invention, even with the use of a conductive filler, can maintain its transparency high enough for confirming the presence of memory disks from the outside of the case. Moreover, the case of the invention can be colored in any color, so that it is possible to classify disks by the use of differently colored cases.

(4) Production of Thermoplastic Resin Composition

The thermoplastic resin composition of the present invention, having excellent antistatic properties can be obtained by mixing the above-described components (A), (B) and (C), and, if necessary, the component (D), in the above-mentioned proportions, and by kneading and granulating the mixture using a conventional kneader such as a single-screw extruder, a twin-screw extruder, a Banbury mixer, a roll mixer, a Brabender Plastograph or a kneading blender.

In this case, it is preferable to select a kneading-granulation method by which all of the components can be fully dispersed. In general, the kneading-granulation is conducted by the use of a twin-screw extruder.

In this kneading-granulation step, the components (A), (B) and (C), and, if necessary, the component (D) may be kneaded at the same time. However, in order to obtain improved properties, it is preferable to conduct stepwise the kneading-granulation; thus, after the component (A) and a part of or all of the component (B) are firstly mixed and kneaded, the components (C) and (D) are added to the mixture, and the resulting mixture is then kneaded and granulated. In the case where all of the components are kneaded at the same time, heat is generated due to the shear caused between the solid phases before the matrix resin (the components (A)+(B)) is plasticized in an extrusion kneader. For this reason, the cylinder temperature can be raised to a temperature considerably higher than the predetermined one. Since the component (C) does not have sufficiently high resistance to heat, there is a fear that it is decomposed due to that high temperature, so that the resulting resin composition has decreased conductivity.

In contrast, when kneading is conducted stepwise, that is, the component (C) is added to the matrix components after the matrix components are plasticized, the component (C) can be kneaded without suffering from the extra heat generated due to the shear between the solid phases of the matrix resin. There is therefore no possibility that the component (C) is thermally decomposed, and the conductivity of the resulting resin composition can thus be prevented from being impaired.

The kneading temperature (the cylinder temperature) during the melt extrusion kneading is usually from 150 to 250° C., preferably from 180 to 230° C., and particularly from 200 to 210° C. When the kneading temperature is lower than 150° C., the difference between the viscosity of the component (A) and that of the component (B) is large, so that a homogenous composition cannot be obtained. On the other hand, when the kneading temperature is higher than 250° C., the component (C) is thermally decomposed.

The kneading time is from 0.5 to 10 minutes, preferably from 1 to 5 minutes, more preferably from 2 to 4 minutes. When the kneading time is shorter than 0.5 minutes, the component (A) cannot be fully plasticized, so that a homogenous composition cannot be obtained. On the other hand, when the kneading time is longer than 10 minutes, the thermal stability of the component (C) may be impaired.

When kneading is conducted stepwise as described above, it is preferable to adopt the following manner: after the components (A) and (B) are kneaded for 0.5 to 2 minutes, preferably for 1 minute (preceding stage of kneading), the component (C) is added to the mixture, and the resulting mixture is kneaded for 0.5 to 2 minutes, preferably for 1 minute (latter stage of kneading). In this case, it is preferable to maintain the kneading temperature (cylinder temperature) constant throughout the preceding stage and latter stage of kneading.

[II] Molding

The thus-obtained thermoplastic resin composition having excellent antistatic properties can be subjected to injection molding to produce the case of the present invention. The injection molding is conducted generally at a cylinder temperature of about 200–210° C. and at a mold temperature of about 30–60° C.

[III] Microstructure

By the electron-microscopic observation of the microstructure of the thermoplastic resin composition of the present invention, having excellent antistatic properties, it can be confirmed that since the above-described specific thermoplastic elastomer, the component (B), is present in the resin composition, the uniform network dispersion of the acrylamide copolymer, the component (C), is attained in the resin composition with the aid of the thermoplastic elastomer, the component (B).

On the other hand, when the thermoplastic elastomer is not present in the thermoplastic resin composition, the uniform network dispersion of the acrylamide copolymer cannot be attained in the resin composition. In this case, the acrylamide copolymer is unevenly distributed in the vicinity of the surface of the thermoplastic resin composition due to the shear caused upon molding, thereby forming a layer. The heterogeneous layer of the acrylamide copolymer thus formed in the vicinity of the surface of the thermoplastic resin composition is easily delaminated from the thermoplastic resin composition.

[IV] Wettability

The time taken for drying up the case for memory disks of the present invention is shorter than the time taken for drying up polycarbonate-made cases. This may be explained by the fact that the contact angle between the surface of the case of the present invention and water is in the range of 50 to 70 degree, and this contact angle is smaller than the contact angle between the surface of a polycarbonate-made case and water, ranging from 73 to 76 degrees. Those materials which have large contact angles with water have high water repellency. Therefore, waterdrops are not easily attached to such materials, and, if waterdrops are attached to them, the sizes of the waterdrops are large, and the contact areas between the waterdrops and the materials are small. On the contrary, in the case of materials which have large contact angles with water, waterdrops are spread on the materials before they become large. Therefore, the waterdrops become thin layers, and the contact areas between the waterdrops and the materials become large. It is thus considered that the time taken for completely drying up the entire case of the present invention is shorter than the time taken for drying up polycarbonate-made cases which have large contact angles with water.

Since dusts are very harmful to memory disks, cases are usually washed before disks are placed therein. When the case for memory disks according to the present invention is used, not only antistatic properties can be obtained, but also the time taken for drying can be shortened. Since cases for memory disks are industrially used generally in plenty, the shortening of the time for drying is very advantageous.

[V] Attenuation and Half-Life Period of Electric Charge

With respect to the case for memory disks of the present invention, 95 to 100% attenuation of electric charge is attained in 3 minutes, and the half-life period of electric charge is 3 seconds or shorter. Since the case of the present invention has such properties, even when a high voltage is applied to the case, the electric charge is attenuated in a short time, and static elimination can be fully attained. Since the half-life period of electric charge is short, the time for attracting dusts existing in surroundings is short, and thus dusts are scarcely attached to the case. In addition, since the attenuation of electric charge is as high as 95 to 100%, if the case is once electrified, it can return to the state before the electrification. The case of the present invention can thus be prevented from the attachment of dusts.

[VI] Surface Resistivity

The case for memory disks of the present invention generally has a surface resistivity of $1 \times 10^{13}$ $\Omega/\square$ or less, preferably $1 \times 10^{12}$ $\Omega/\square$ or less, more preferably $1 \times 10^{11}$ $\Omega/\square$ or less. When a case having a surface resistivity of more than $1 \times 10^{13}$ $\Omega/\square$ is electrified, a rapid static elimination cannot be made and the electric charge remains for a long time on the surface of the case. Such an electrified case easily attracts dusts in surroundings, and thus makes the contents contaminated. A case having a surface resistivity of about $1 \times 10^{12}$–$1 \times 10^{13}$ $\Omega/\square$ is somewhat affected by the surrounding atmosphere (especially humidity), and its static elimination is sometimes insufficient in a low-humidity atmosphere. A case having a surface resistivity of less than $1 \times 10^{11}$ $\Omega/\square$ always exhibits a high static elimination effect irrespective of its surrounding atmosphere.

The present invention will now be explained more specifically by referring to the following Examples and Comparative Examples. It should be noted that these examples are not limiting the present invention in any way.

[I] Starting Materials (1) Component (A): Crystalline Propylene Resin

Ethylene-propylene copolymer resin, "Mitsubishi Polypro BC3" manufactured by Mitsubishi Chemical Corp. (MFR=10.0 g/10 min, ethylene content=9% by weight, crystallinity=65%)

(2) Component B: Thermoplastic Elastomer (b$^1$) Olefin Copolymer Elastomer

Ethylene-propylene copolymer elastomer, "EP07P" manufactured by Japan Synthetic Rubber Co., Ltd. (Mooney viscosity=70, weight-average molecular weight=230,000, ethylene content=70% by weight)

(3) Component (C): Acrylamide Copolymer

Acrylamide copolymer obtained in the following synthetic example:

(Synthetic Example) In a four-necked 10-liter flask equipped with a thermometer, a stirrer, a dropping funnel and a Dean-Stark trap, 4000 ml of xylene, 1500 g of an ethylene-ethyl acrylate-acrylic acid copolymer (the mol % ratio of ethylene/ethyl acrylate/acrylic acid being 90/5/5), and 10.0 g of p-toluene-sulfonic acid were charged. To this was added 264 g of N,N-dimethylaminopropylamine, and the mixture was heated to 140° C. by using an oil bath. Water produced was continuously removed by azeotropic distillation with xylene, and reaction was carried out at 140° C. for a further 17 hours. The amidation reaction was continued until water produced was not azeotropically distilled any more.

6000 g of the product thus obtained was cooled to 80° C. To this, 415 g of diethyl sulfate was gradually added dropwise from the dropping funnel over one hour. The reaction temperature was maintained at 90° C. by cooling the heat generated. After the dropping was completed, aging reaction was carried out at 100° C. for 4 hours. The product obtained was poured into a large amount of methanol. The precipitates produced were collected, and dried to obtain an acrylamide copolymer.

The yield of the acrylamide copolymer was 97.3% when calculated on the basis of the starting material, the ethylene-ethyl acrylate-acrylic acid copolymer. The weight-average molecular weight of the acrylamide copolymer was 5,500.

[II] Evaluation Methods (1) Electrical Conductivity (Initial)

In order to evaluate the electrical conductivity, the surface resistivity (ohm/$\square$) was measured by using a resistance meter "High Resta" manufactured by Mitsubishi Chemical Corp.

(2) Antistatic Properties (after 10-time washing)

The permanency of the antistatic properties (electrical conductivity) was evaluated by measuring the electrical conductivity of a molded product after the following procedure was repeated 10 times: the surface of the molded product was thoroughly washed with ion exchange water, and wiped with gauze to remove the water, and the molded product was then dried at 60° C. for 5 hours in a warm-air-circulating drier.

(3) Staining and Marring

Eight memory disks (aluminum-made hard disks, outer diameter=95 mm, inner diameter=25 mm, thickness=0.8 mm) were placed in an experimental case, and a lid was put on the case. This case was vibrated in the vertical direction by using an accelerator for 5 minutes, under the conditions that the amplitude of vibration was 30 cm and the number of vibration was 100 times/min. Thereafter, the disks were taken out, and visually observed in terms of the substances peeled off or come off the cases, dusts, etc. attached to the surfaces of the disks, and also marring. The staining was thus evaluated.

(4) Wettability (Contact Angle)

A waterdrop was dropped on the surface of an experimental molded plate, and the angle between the surface of the specimen and the tangent to the initial curve of the waterdrop was measured while the waterdrop kept its stable state. The measurement was carried out by using a goniometer, Model G-1, manufactured by Erma Corporation.

(5) Attenuation and Half-Life Period of Electric Charge 10 kV direct voltage was applied to the surface of a test specimen for 2 minutes by means of corona discharge. After the application of the voltage was stopped, the attenuation of electric charge was continuously measured. The measurement was carried out by using Antistatic Honesto meter manufactured by Shishido Denki Kabushiki Kaisha.

(6) Drying Characteristics

An experimental case for memory disks was dipped in water. Thereafter, the case was pulled out from the water, and allowed to stand still as it was at room temperature. The state of drying on the surface of the case was visually observed.

○. . . Dried in a short time

Δ. . . Dried in a relatively long time

[III] Experiments

EXAMPLES 1 AND COMPARATIVE EXAMPLE 1

The above-described starting materials were mixed in accordance with the formulation shown in Table 1, and the mixture was melt-kneaded by a twin-screw extruder ("KTX40" manufactured by Kobe Steel, Ltd.; cylinder temperature=200° C., number of revolutions of the screws= 220 rpm) for 2 minutes, thereby preparing pelleted compositions.

From each of the pelleted compositions, plates having a thickness of 1 mm, a width of 150 mm and a length of 300 mm to be used for the above measurements were prepared by using an injection molding machine ("IS170" manufactured by Toshiba Corp.) (cylinder temperature=220° C., mold temperature=40° C., cooling time=20 seconds, injection pressure=500 kg/cm$^2$, dwell pressure=450 kg/cm$^2$, injection speed=3 second/shot, dwell time=12 seconds).

Figure 2:
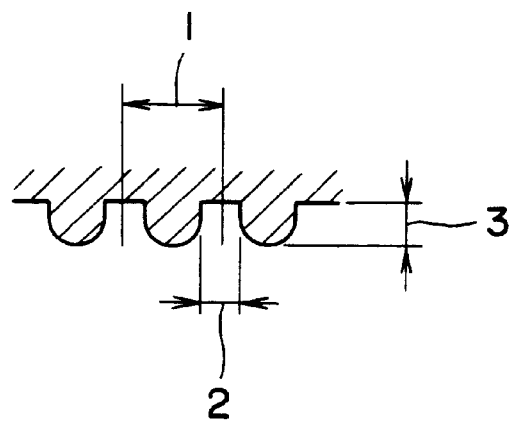
FIG. 2 is an enlarged view showing the part A in FIG. 1.

Further, the pelleted composition was molded into a case for experiment (see FIG. 1), in which eight memory disks can be stored, by using the above injection molding machine at a cylinder temperature of 210° C. The details of this case are as follows: the pitch between disk-holding slots (see FIG. 2, numeral 1) is 6 mm; the width of the slot at the deepest part thereof (FIG. 2, numeral 2) is 1.5 mm; the depth of the slot (FIG. 2, numeral 3) is 3.2 mm; the height of the case (FIG. 1, numeral 4) is 100 mm; the depth of the case (FIG. 1, numeral 5) is 68 mm; and the width of the case (FIG. 1, numeral 6) is 103 mm.

In accordance with the above-described evaluation methods, evaluation was conducted by using the plates and the cases obtained. The results are shown in Table 1.

COMPARATIVE EXAMPLE 2

Using a polycarbonate resin (trade name "Eupilon S-1000" manufactured by Mitsubishi Engineering Plastic Corp., density=1.2 g/cm$^3$, volume resistivity=10$^{16}$ Ω•cm), a plate and a case were prepared by means of injection molding in the same manner as in Example 1 but at a molding temperature of 280° C., and evaluated in the same manner as in Example 1. The results are shown in Table 1.

|  | Example 1 | Comp. Example 1 | Comp. Example 2 |
|---|---|---|---|
| Thermoplastic Resin |  |  |  |
| Component (A): Crystalline propylene resin | 100 | 100 | 0 |
| Component (B): Thermoplastic elastomer | 7 | 0 | 0 |
| Component (C): Acrylamide copolymer | 20 | 20 | 0 |
| Component (D): Polycarbonate | 0 | 0 | 100 |
| Results of Evaluation |  |  |  |
| Surface resistivity (initial) Ω/□ | 7 × 10$^{10}$ | 7 × 10$^{11}$ | >1 × 10$^{15}$ |
| Surface resistivity (after 10-time washing) Ω/□ | 8 × 10$^{10}$ | 7 × 10$^{12}$ | >1 × 10$^{15}$ |
| Staining and marring (*1) | 0 | 6 | 1 |
| Contact angle (Degrees) | 66 | 70 | 76 |
| Attenuation of electric charge (%) | 100 | 90 | 10 |
| Half-life period of electric charge (sec) | 0.8 | 12 | >180 |
| Drying characteristics | ○ | ○ | Δ |

(*1: The number of stained memory disks out of 8 memory disks.)

Figure 3:
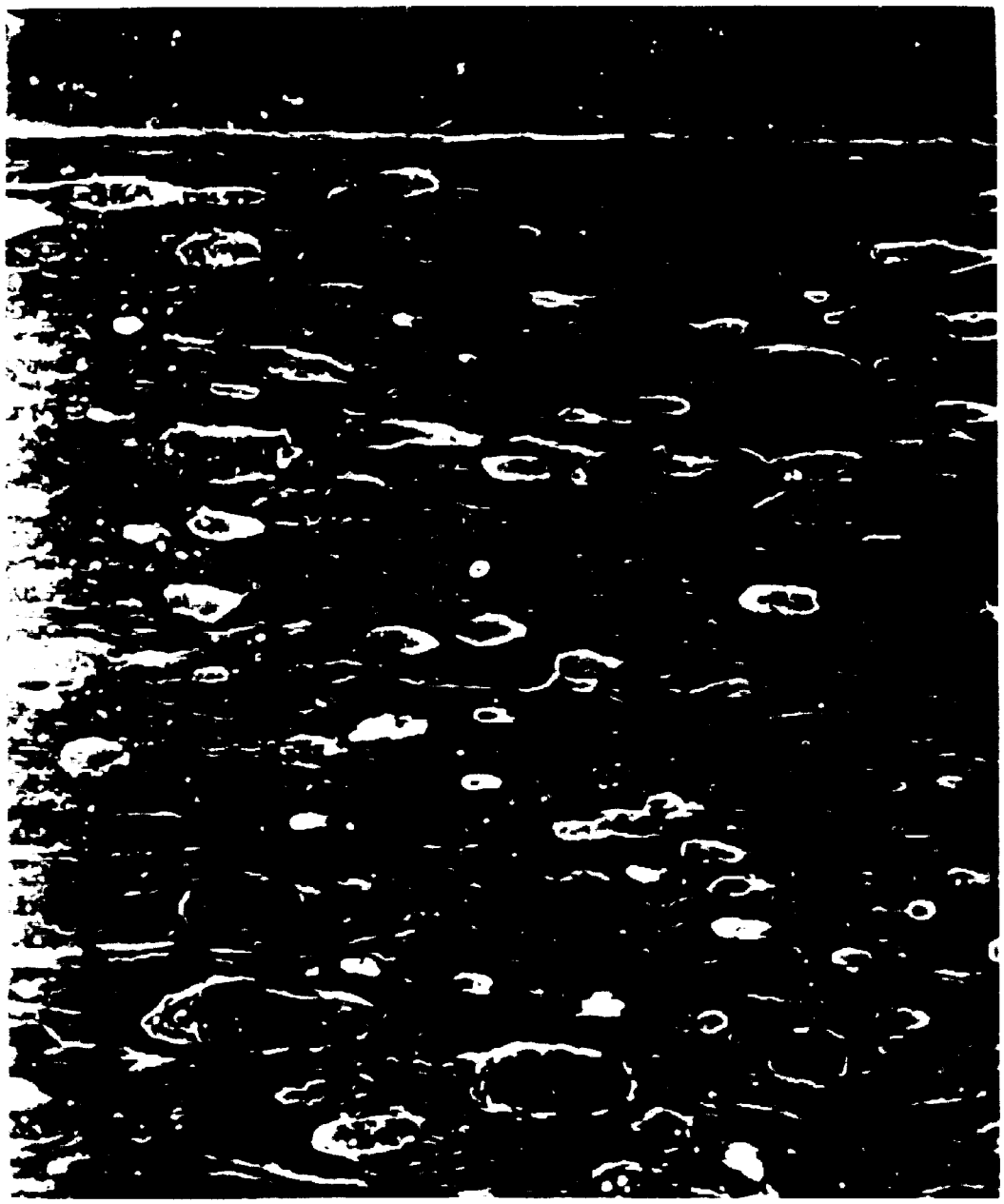
FIG. 3 is an electron photomicrograph (5,000× magnification) of the cross section of the molded plate obtained in Example 1.

FIG. 3 is an electron photomicrograph (5,000× magnification) of the cross section of the molded plate obtained in Example 1. As is clear from FIG. 3, in the molded product from the thermoplastic resin composition according to the present invention, a matrix structure is formed by the propylene resin component, and the acrylamide copolymer component is reticulately dispersed in the matrix via the thermoplastic elastomer component. Due to such a morphology, the case of the present invention can reveal excellent antistatic properties permanently without adding any additive such a conductive filler.

Figure 4:
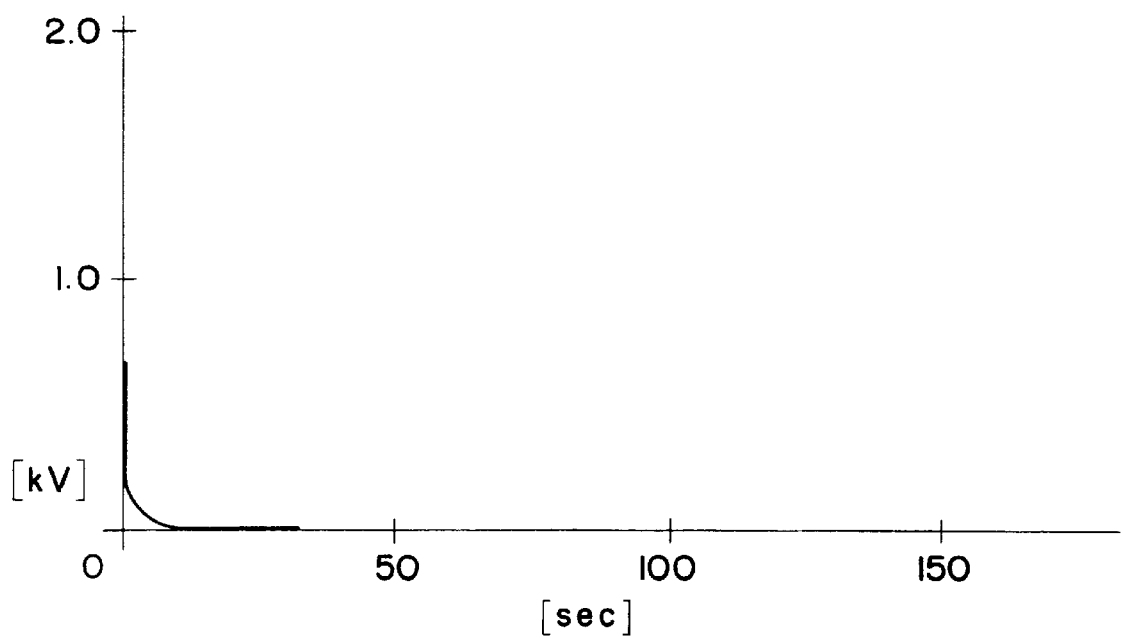
FIG. 4 is a graph showing the charge attenuation characteristics of the case obtained in Example 1.

FIG. 4 is a graph showing the electrification characteristics of the case for memory disks of the present invention obtained in Example 1. As shown in the graph, the quantity of electric charge itself was as small as 0.69 kV, and, in addition, the time taken before the quantity of electric charge became 0.34 kV, almost half of 0.69 kV, was immeasurably short(less than one second).

Moreover, almost 100% attenuation of electric charge was attained within 50 seconds.

As explained above, the case for memory disks according to the present invention is made by using the specific material having the specific microstructure, so that it can reveal excellent antistatic properties permanently without using a conductive filler or the like. In addition, since fillers are not necessarily used, the material used for producing the case shows good moldability, and can be molded into a precise case to be used for transporting thin materials as memory disks without shaking them. Moreover, the case of the present invention has the advantages that the degree of freedom of coloring is high, so that it becomes possible to classify various kinds of disks by the various colors of the case, and, due to its transparency, the presence of memory disks stored in the case can be visually confirmed from the outside of the case.

In addition to the above, since the material for the case is relatively soft, the case can absorb impact force when the case and disks are made contact with each other. Therefore, the disks are not marred, and cuttings are not produced from the contact area.

Furthermore, the attenuation of electric charge is very high, and, at the same time, the half-life period of electric charge is short. Therefore, if the case is electrified, there is few possibility that the case attracts dusts present in surroundings. In addition, the case for memory disks of the present invention has the following excellent properties: the contact angle between the case and water is relatively small, and the time taken for drying up the case after washing can be shortened.

What is claimed is:

1. A case for a memory disk having stable and permanent antistatic properties, obtained from a thermoplastic resin composition comprising 100 parts by weight of the following component (A), 3 to 30 parts by weight of the following component (B) and 5 to 40 parts by weight of the following component (C):

component (A): a crystalline propylene resin having a melt flow rate (MFR) of 1 to 80 g/10 min;

component (B): a thermoplastic elastomer selected from the group consisting of (b$^1$) olefin copolymer elastomers having a Mooney viscosity (ML$_{1+4}$ (100° C.)) of 10 to 85, and (b$^2$) hydrogenated products of a block copolymer of styrene or a derivative thereof and a conjugated diene, containing 15 to 50% by weight of styrene or a derivative thereof, having a weight-average molecular weight of 50,000 to 220,000; and component (C): an acrylamide copolymer wherein the component (C), is one having a weight-average molecular weight of 1,000 to 50,000, comprising the following structural units which are linearly and irregularly arranged:

65 to 99 mol % of ethylene structural unit represented by the following formula (I):

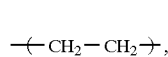
(I)

0 to 15 mol % of acrylate structural unit represented by the following formula (II):

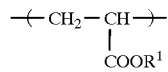
(II)

wherein $R^1$ represents an alkyl group having 1 to 4 carbon atoms, and 1 to 35 mol % of acrylamide structural unit represented by the following formula (III):

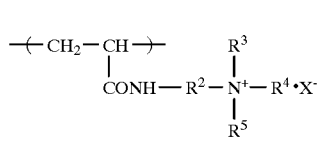
(III)

wherein $R^2$ represents an alkylene group having 2 to 8 carbon atoms, $R^3$ and $R^4$ each represent an alkyl group having 1 to 4 carbon atoms, $R^5$ represents an alkyl group having 1 to 12 carbon atoms, an arylalkyl group having 1 to 12 carbon atoms, or an alicyclic alkyl group having 1 to 12 carbon atoms, and $X^-$ represents a halogen ion, $CH_2OSO_3^-$ or $C_2H_5OSO_3^-$;

or 65 to 99 mol % of ethylene structural unit represented by the following formula (IV):

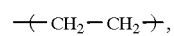
(IV)

0 to 15 mol % of acrylate structural unit represented by the following formula (V):

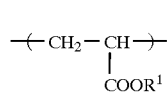
(V)

wherein $R^1$ represents an alkyl group having 1 to 4 carbon atoms, and 1 to 35 mol % of acrylamide structural unit represented by the following formula (VI):

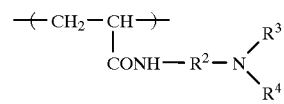
(VI)

wherein $R^2$ represents an alkylene group having 2 to 8 carbon atoms, and $R^3$ and $R^4$ each represent an alkyl group having 1 to 4 carbon atoms.

2. The case according to claim 1 which is prepared by a process comprising first mixing and melt-kneading the components (A) and (B), adding the component (C) to the resulting mixture and then further melt-kneading the resulting mixture.

3. The case according to claim 1, wherein the crystalline propylene resin, the component (A), has an MFR of 3 to 40 g/10 min.

4. The case according to claim 1, wherein the thermoplastic elastomer, the component (B), is an ethylene-propylene copolymer elastomer having a Mooney viscosity ($ML_{1+4}$ (100° C.)) of 20 to 75.

5. The case according to claim 1, wherein the thermoplastic elastomer, the component (B), is a hydrogenated product of a styrene-butadiene block copolymer or a styrene-isoprene block copolymer having a styrene content of 20 to 40% by weight.

6. The case according to claim 1, wherein the thermoplastic resin composition is obtained in the following manner: after the components (A) and (B) are melt-kneaded at a temperature of 150 to 250° C. for 0.5 to 2 minutes, the component (C) is added to the mixture, and the resulting mixture is further subjected to melt-kneading conducted at a temperature of 150 to 250° C. for 0.5 to 2 minutes.

7. The case according to claim 1, wherein the thermoplastic resin composition has such a morphology that the component (C) is reticulately dispersed, via the component (B), in the component (A) forming a matrix structure.

8. The case according to claim 1, wherein when 10 kV of electric voltage is applied to the surface of the case for 2 minutes to generate electric charge, the quantity of the electric charge decreases to half within 3 seconds after the application of the electric voltage is stopped, and from 95 to 100% attenuation of the electric charge is attained in 3 minutes after the application of the electric voltage is stopped.

9. The case according to claim 1, having a surface resistivity of $10^{13}$ Ω/□ or less, the contact angle between the surface of the case and water being from 50 to 70 degrees.

* * * * *